(12) United States Patent
Kawase et al.

(10) Patent No.: US 7,489,286 B2
(45) Date of Patent: Feb. 10, 2009

(54) DISPLAY APPARATUS

(75) Inventors: Kimitaka Kawase, Kanagawa (JP); Yoshikazu Takahashi, Kanagawa (JP); Minoru Nakano, Kanagawa (JP)

(73) Assignee: Sony Corporation (JP)

( * ) Notice: Subject to any disclaimer, the term of this patent is extended or adjusted under 35 U.S.C. 154(b) by 686 days.

(21) Appl. No.: 11/147,307

(22) Filed: Jun. 8, 2005

(65) Prior Publication Data

US 2005/0285811 A1    Dec. 29, 2005

(30) Foreign Application Priority Data

Jun. 23, 2004    (JP)    ............................. 2004-184695

(51) Int. Cl.
*G09G 5/00*    (2006.01)
(52) U.S. Cl. .......................... 345/1.1; 345/4
(58) Field of Classification Search .............. 345/1.1–6; 348/917–924
See application file for complete search history.

(56) References Cited

U.S. PATENT DOCUMENTS

| | | | | |
|---|---|---|---|---|
| 5,903,328 A * | 5/1999 | Greene et al. | .................. | 349/73 |
| 6,927,908 B2 * | 8/2005 | Stark | .......................... | 359/449 |
| 6,970,210 B2 * | 11/2005 | Kim et al. | ..................... | 349/58 |
| 2003/0076277 A1 * | 4/2003 | Muramatsu et al. | .......... | 345/1.1 |

FOREIGN PATENT DOCUMENTS

| | | |
|---|---|---|
| JP | 59-71083 | 4/1984 |
| JP | 61-138286 | 6/1986 |
| JP | 09-311344 | 12/1997 |
| JP | 2000-347184 | 12/2000 |
| JP | 2001-056458 | 2/2001 |
| JP | 2001-147667 | 5/2001 |
| JP | 2002-229485 | 8/2002 |
| JP | 2003-098984 | 4/2003 |
| JP | 2004-251981 | 9/2004 |
| JP | 2005-017738 | 1/2005 |

OTHER PUBLICATIONS

Japanese Office Action dated Apr. 22, 2008 for corresponding Japanese Application No. 2004-184695.

* cited by examiner

*Primary Examiner*—Richard Hjerpe
*Assistant Examiner*—Christopher E Leiby
(74) *Attorney, Agent, or Firm*—Rader Fishman & Grauer PLLC; Ronald P. Kananen

(57) ABSTRACT

There is provided a display apparatus comprising: first display means including a first display section; and second display means including a second display section and a non-display section located at an outer periphery of the second display section; wherein partial area of a display surface of the first display section of the first display means faces the non-display section of the second display means; and wherein portion of the non-displaying section of the second display means, which is facing the display surface of the first display section is provided with a transmission section configured to transmit light from the first display section.

18 Claims, 16 Drawing Sheets

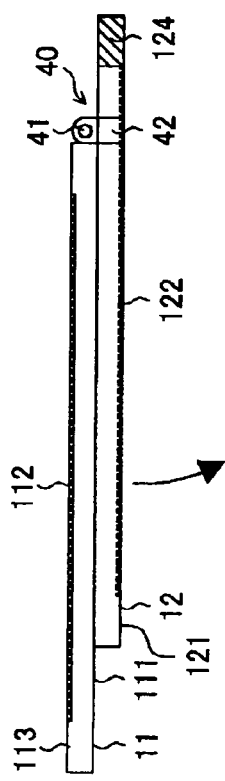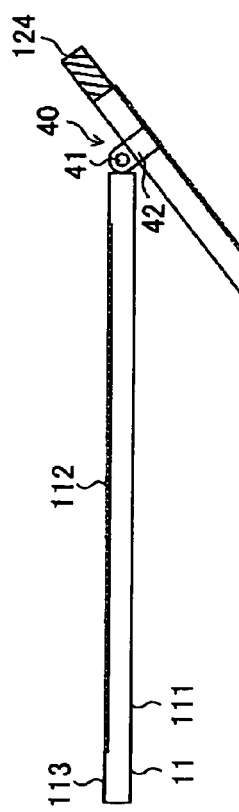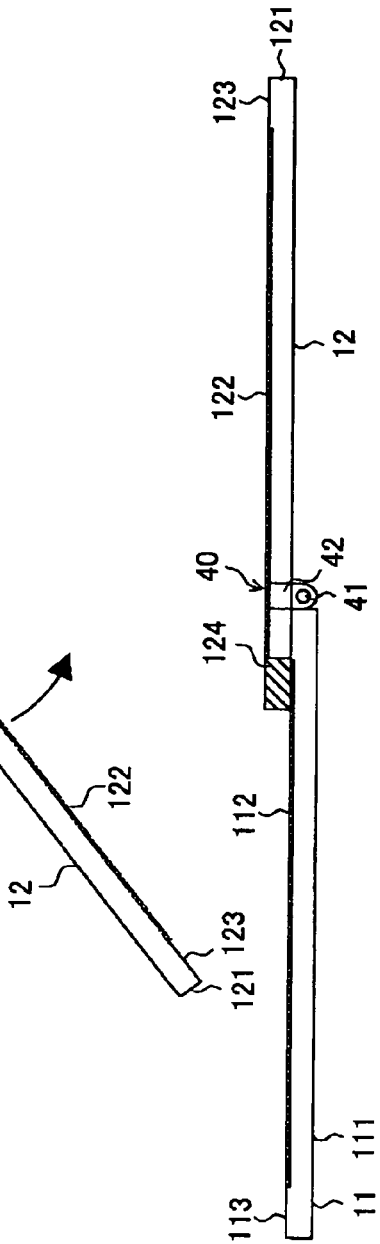

DISPLAY APPARATUS

CROSS REFERENCES TO RELATED APPLICATIONS

The present document contains subject matter related to Japanese Patent Applications JP 2004-184695 filed in the Japanese Patent Office on Jun. 23, 2004, the entire contents of which are incorporated herein by reference.

BACKGROUND OF THE INVENTION

1. Field of the Invention

The present invention relates to a display apparatus including a combination of a plurality of display means such as, for example, a display panel, etc.

2. Description of Related Art

In recent years, there has been much activity in research and development of flat displays such as liquid crystal displays, organic EL (electroluminescent) displays, and paper-like displays referred to as so-called electronic paper.

In particular, liquid crystal displays are widely implemented in various applications. For example, liquid crystal displays have become widespread as displays replacing CRTs (Cathode Ray Tubes) in televisions for indoor use. Liquid crystal displays are also broadly used in mobile equipment such as notebook PC's (Personal Computers), PDA's (Personal Digital Assistants), mobile telephones, video cameras, digital cameras, and electronic dictionaries, etc. for outdoor use. Further, organic EL displays already have been implemented in some mobile equipment and also may be implemented prospectively as electronic books with electronic paper.

These displays have the benefit of being flat and, as such, are indispensable for applications in mobile equipment. On the other hand, in recent years, the transmission and receipt of large volumes of information has become possible due to technological advancement with regard to increasing capacity of recording media, making signal processors high-speed, and increases in speed of forms of communication such as the Internet, telephony, and broadcasting, etc. It is therefore preferable for displays outputting human interfaces to be of high resolution and to be large so as to browse a lot of information at once.

However, if a large-type display is researched for mobile equipment, the equipment itself becomes large. It is therefore necessary for a display to be stored in a compact manner to ensure compatibility between compactness of equipment and largeness of a display. For example, methods exist for achieving compactness by folding away a display. However, edge portions of a display area are positioned at folding boundary portions and information at these portions is therefore lost. With regards to this, display apparatus for reducing a non-display region of a boundary portion are well-known (for example, refer to Japanese Patent Laid-open Publication No. 2002-229485).

With the display apparatus described above, light-guiding sections such as optical fiber, etc. are necessary, and a volume and a weight of a display apparatus therefore increase by the extent of a portion for the thickness of the light-guiding sections in a folded mode. Further, complex operations are necessary to form these light-guiding sections.

In the present invention, it is desirable to provide a display apparatus employing a plurality of display means capable of reducing a non-displaying region with a simple configuration.

SUMMARY OF THE INVENTION

According to an embodiment of the present invention, a display apparatus includes: first display means equipped with a first display section; and second display means equipped with a second display section and a non-displaying section positioned at the outer periphery of the second display section. A partial area of a display surface of the first display section of the first display means faces the non-displaying section of the second display means, and a portion of the non-displaying section of the second display means that is facing the display surface of the first display section is provided with a transmission section for transmitting light from the first display section.

With the display apparatus according to an embodiment of the present invention, light from the first display section is transmitted through a transmission section formed in a portion of the non-displaying section of the second display means facing the display surface of the first display section.

BRIEF DESCRIPTION OF THE DRAWINGS

The above and other objects, features and advantages of the present invention will become more apparent from the following description of the presently-preferred exemplary embodiment of the invention taken in conjunction with the accompanying drawing, in which:

FIG. 14 is a side view of a display apparatus according to the ninth embodiment of the present invention.

FIG. 15A is a side view of a display panel 12. FIG. 15B is a side view of a display panel 11. FIG. 15C is a side view of a junction section. FIG. 15D is a side view of a specific example of the display apparatus in a miniaturized mode. FIG. 15E is a side view of the unfolded display apparatus shown in FIG. 15D; and FIG. 16A to FIG. 16C are side views of a display apparatus according to the eleventh embodiment of the present invention. FIG. 16A is a side view of the miniaturized display apparatus. FIG. 16B is a side view of the display apparatus shown in FIG. 16A in the process of unfolding. FIG. 16C is a side view of the unfolded display apparatus shown in FIG. 16A.

DESCRIPTION OF EMBODIMENTS

Figure 1:
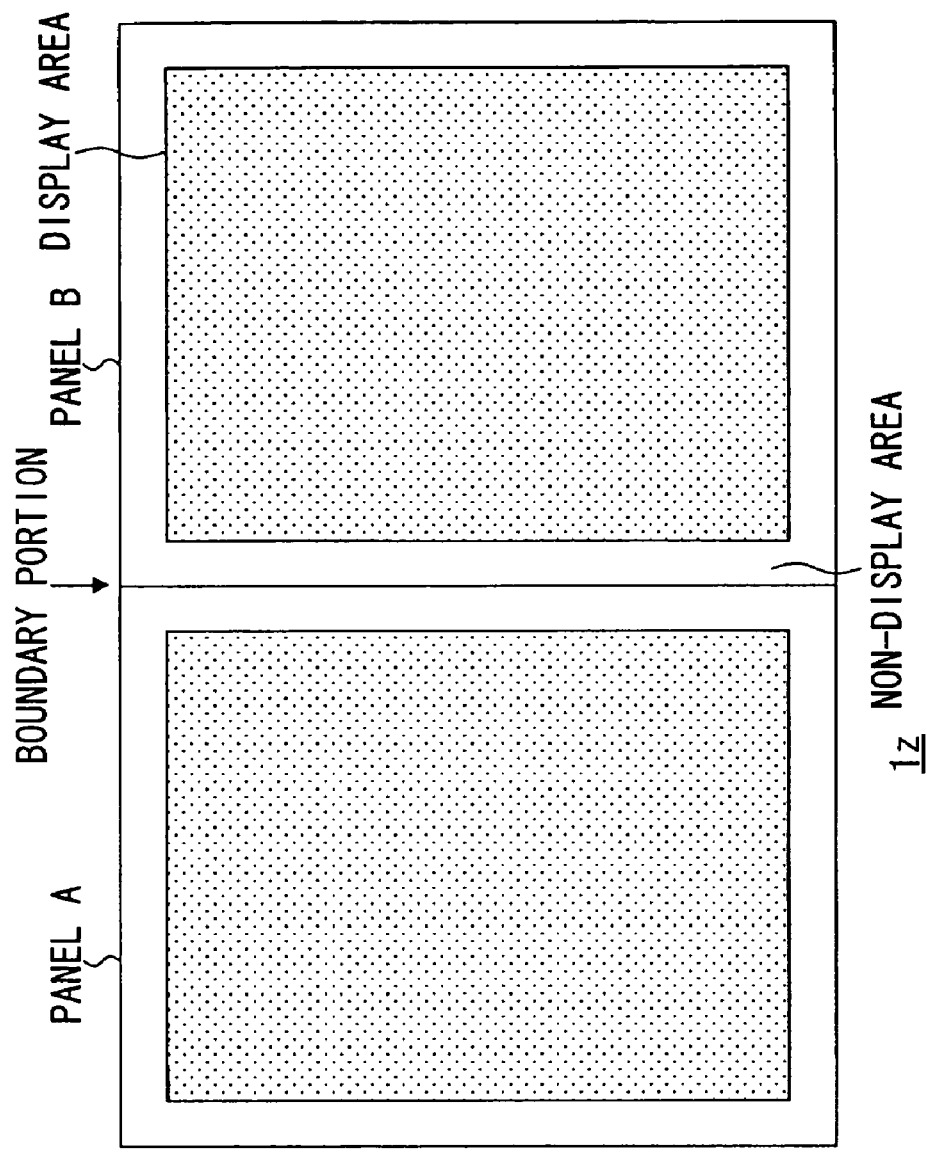
FIG. 1 is a front view of a general display apparatus having a plurality of panels.

FIG. 1 is a front view of a typical display apparatus having a plurality of panels. As shown in FIG. 1, with a typical display apparatus 1z, two panels, panel A and panel B, are lined up next to each other, with frame portions in the vicinity of boundary portions of the panels A and B being non-displaying areas, and with image information being lost at these areas.

The display apparatus according to an embodiment of the present invention includes, for example, first display means equipped with a first display section and second display means equipped with a second display section and a non-displaying section positioned at the outer periphery of the second display section. A partial area of a display surface of the first display section of the first display means faces the non-displaying section of the second display means, and a portion of the non-displaying section of the second display means that is facing the display surface of the first display section is provided with a transmission section for transmitting light from the first display section. Namely, with the display apparatus configured from a plurality of panels, non-displaying areas of boundary sections are reduced by overlapping edge portions of the panels.

In the following, an embodiment of a display apparatus of the present invention is described with reference to the drawings.

First Embodiment

Figure 2:
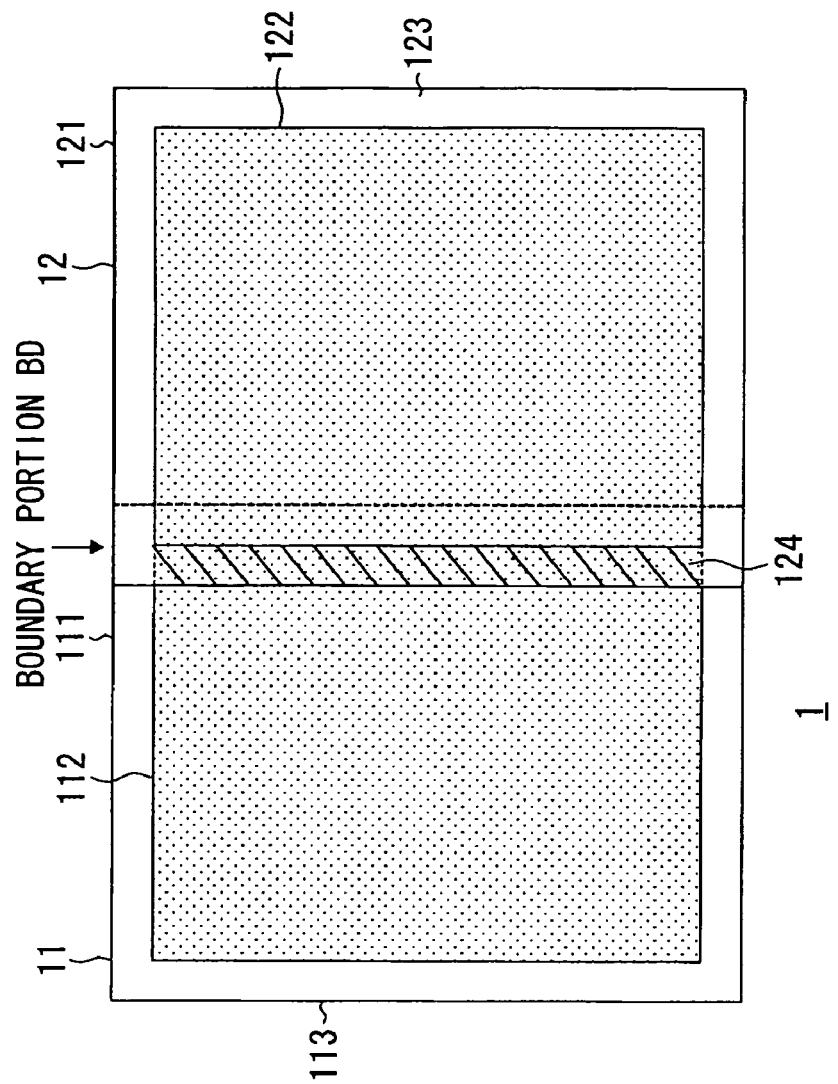
FIG. 2 is a front view of a display apparatus according to the first embodiment of the present invention.
Figure 3:
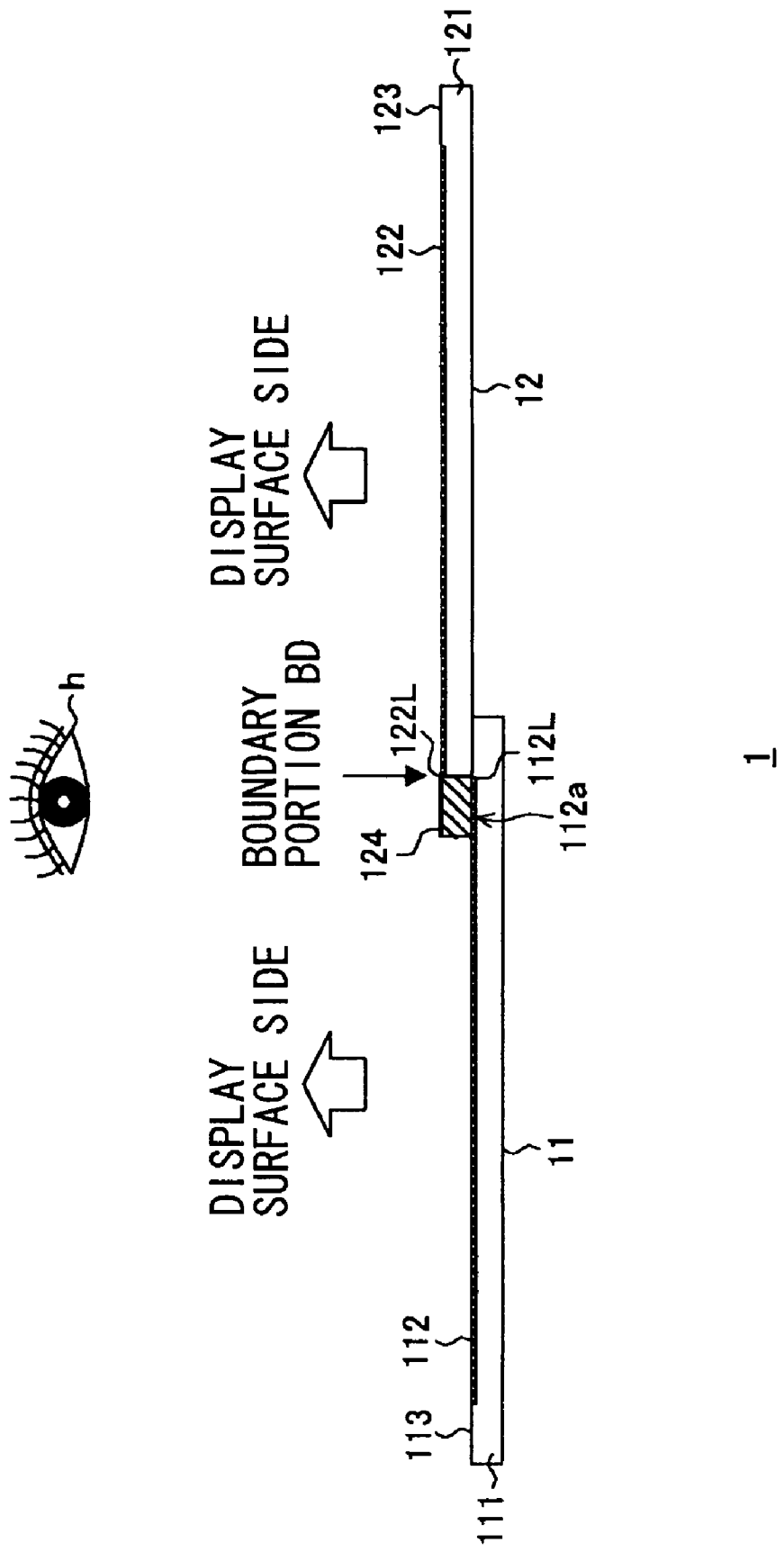
FIG. 3 is a cross-sectional view of the display apparatus shown in FIG. 2.

FIG. 2 is a front view of a display apparatus of a first embodiment of the present invention. FIG. 3 is a cross-sectional view of the display apparatus shown in FIG. 2. A display apparatus 1 according to a first embodiment of the present invention includes, as shown, for example, in FIG. 2 and FIG. 3, a display board (display panel) 11 and a display board (display panel) 12.

The display panel 11 corresponds to an example of the first display means of the present invention, and the display panel 12 corresponds to an example of the second display means of the present invention.

As shown, for example, in FIG. 2 and FIG. 3, the display panel 11 includes a substrate 111, display section 112, and non-displaying section 113. In the present embodiment, at the display panel 11, the display section 112 is formed in the central portion at the upper surface side, i.e., at a surface side facing the display panel 12, of the board 111. The non-displaying section 113 is formed at an outer peripheral section of the display section 112.

The display panel 12 is positioned at the display surface side of the display panel 11. Namely, the display panel 12 is held in such a manner as to overlap at the display surface side of the display panel 11.

As shown, for example, in FIG. 2 and FIG. 3, the display panel 12 includes a substrate 121, a display section 122, a non-displaying section 123 and a transmission section 124. The substrate 121 may be constructed, for example, from a member transmitting light, specifically a member such as glass, plastic or film, etc.

In this embodiment, as shown in FIG. 2 and FIG. 3, at the display panel 12, the display section 122 is formed in the central portion at an upper surface side of the substrate 121, or at the other surface side to the surface facing the display panel 11. The display section 112 and the display section 122 described above are constructed from a display apparatus such as, for example, a liquid crystal display apparatus or an organic electroluminescent (EL) display apparatus, etc. Further, the display section 112 or the display selection 122 may be a transmissive liquid crystal display apparatus, a reflective transmissive liquid crystal display apparatus, or a semi-transmissive liquid crystal display apparatus, if a liquid crystal display apparatus is adopted. The display section 112 and the display section 122 may be a display apparatus displaying using a desired drive method such as an active matrix or a passive matrix display apparatus, etc.

The non-displaying section 123 is formed, for example, at an outer peripheral section (peripheral section) of the display section 122. The transmission section 124 is formed at a portion of the non-displaying section 123 of the display panel 12 facing the display surface of the display section 112 of the display panel 11 so as to transmit light from the display section 112.

Specifically, in a mode where the display panel 11 and the display panel 12 are overlapping, the transmission section 124 transmits light from a region where the display section 112 of the display panel 11 overlaps in a direction from a surface facing the display apparatus 1 towards the other facing surface.

The transmission section 124 may be constructed, for example, from a member transmitting light, specifically a member such as glass, plastic or film, etc. Further, it is preferable for the transmittance of the transmission section 124 to be higher, in the order of, for example, 50% to 100%. Moreover, the transmission section 124 may be formed integrally with the substrate 121 or may be formed separately next to the substrate 121. If the transmission section 124 and the substrate 121 are formed in an integral manner, this is preferable in bringing about a more straightforward configuration.

Further, circuits relating to displaying for the display section 122 are formed at portions, other than the transmission section 124, of the non-displaying section 123. For example, substrate wiring and island patterns are not formed at the transmission section 124. This means that light from the display section 112 may be emitted without being obstructed by wiring or island patterns so as to enable high-quality images to be displayed at the surface of the transmission section 124.

Further, as shown, for example, in FIG. 2 and FIG. 3, the display panel 11 and the display panel 12 are lined up next to each other in a horizontal direction. Specifically, in the vicinity of a boundary portion BD of the display panel 11 and display panel 12, it is preferable for an end section 112L of the display section 112 and an end section 122L of the display section 122 to be arranged in such a manner as to overlap, as shown in FIG. 2 and FIG. 3, when viewed from a front surface h of the display surface side. As a result, the non-displaying area of the boundary portion BD may be reduced and in turn, the non-displaying area of the boundary portion BD may be reduced to zero.

With the above configuration, a partial area 112a of the display surface of the display section 112 of the display panel 11 faces the non-displaying section 123 of the display panel 12. Light emitted from the partial area 112a of the display surface of the display section 112 of the display panel 11 is emitted to the display surface side via the overlapping transmission section 124 of the non-displaying section 123 of the display panel 12.

Specifically, at the transmission section 124, light from the partial area 112a of the display surface of the display section 112 of the display panel 11 is emitted in a direction from a surface facing the display panel 11 to the other facing surface.

Moreover, an end portion 112L of the display section 112 and an end portion 122L of the display section 122 are arranged so as to overlap in the vicinity of the boundary portion BD of the display panel 11 and the display panel 12 when viewed from the front h on the display surface side. A continuous large display screen is therefore constituted by the display surface of the display section 112 of the display panel 11, the display surface of the display section 122 of the display panel 12, and the display surface due to the transmission section 124.

As described above, it is therefore possible to reduce a non-displaying area using a simple configuration in a display apparatus using the plurality of display panels 11 and 12.

Further, it is also possible to reduce the thickness of the display panel because, for example, light-guiding sections such as polarizing film, etc. are not provided at the surface of the display section 112 and the display section 122.

Second Embodiment

A display apparatus 1a according to a second embodiment of the present invention has substantially the same configuration as the first embodiment, but it has a point of distinction which is that it corrects a drop in brightness of light due to the transmittance by the transmission section 124. In the following, a description is given of a specific example with reference to the drawings.

Figure 4:
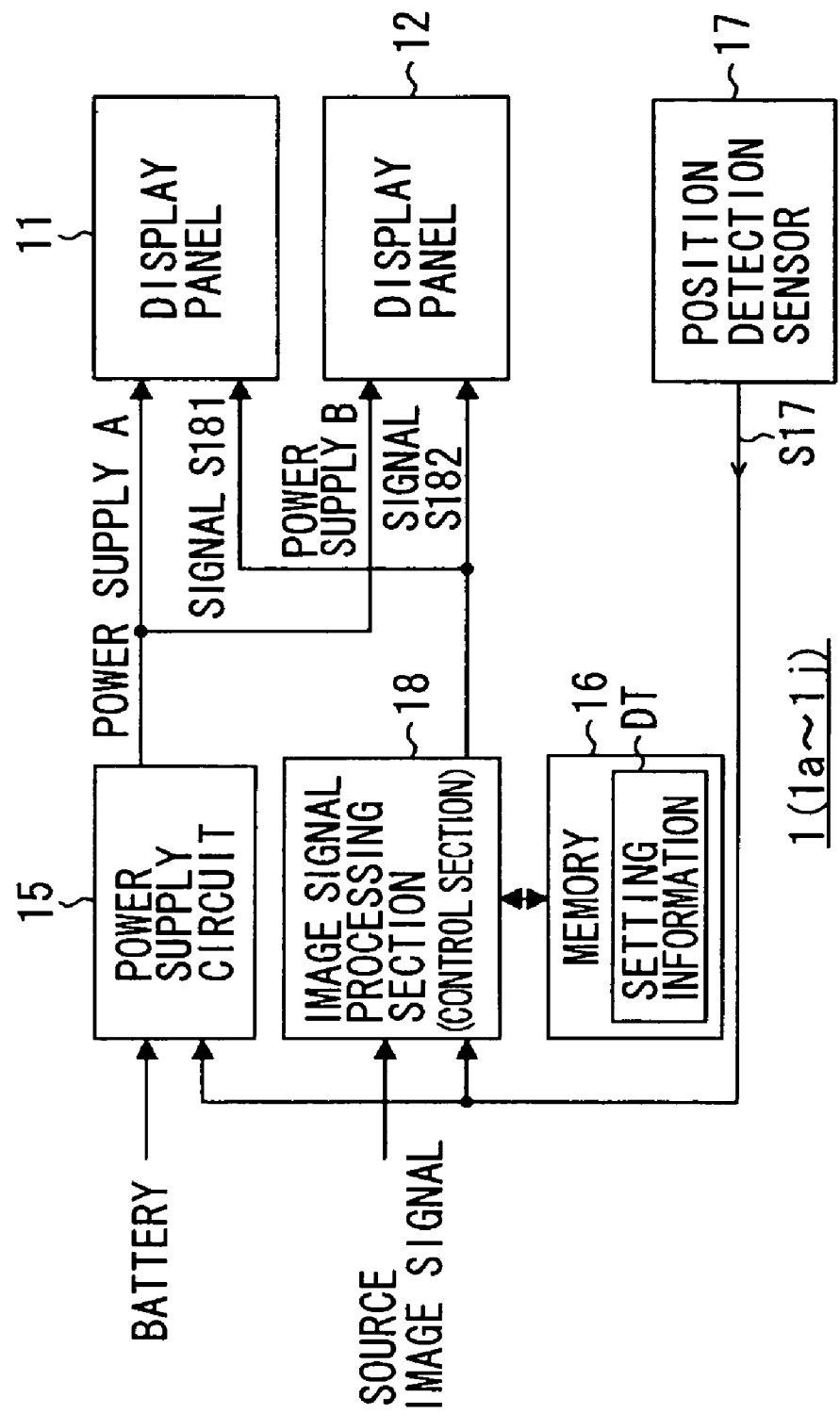
FIG. 4 is a functional block diagram electrically showing a display apparatus according to the second embodiment of the present invention.

FIG. 4 is a block view of electrical functions of a display apparatus according to a second embodiment of the present invention. As shown, for example, in FIG. 4, a display apparatus 1a of the present embodiment includes display panels 11 and 12, a power supply circuit 15, a storage section (memory) 16, a position detection sensor 17 and an image signal processing section (control section) 18. The position detection sensor 17 corresponds to an example of detection means of an embodiment of the present invention and the image signal processing-section 18 corresponds to an example of the control means of an embodiment of the present invention.

The display panels 11 and 12 have the same configuration as in the aforementioned embodiment and are therefore not described here. The power supply circuit 15 converts, for example, current and voltage supplied from a battery to predetermined voltages and currents for providing to the display panel 11 and display panel 12.

The memory 16 is a storage apparatus such as, for example, RAM (Random Access Memory) or ROM (Read Only Memory), etc. The memory 16, for example, stores a program PRG having functions for the present invention and setting information DT, etc. The setting information is information pertaining to the display panel 11 and the display panel 12 such as, for example, transmittance of the transmission section 124 and transmittance of the substrate 111 and the substrate 121, etc. It is possible to change and set the program PRG and setting information DT according, for example, to signals from an input section operated by a user (not shown).

The position detection sensor 17, for example, detects overlapping of the display panel 11 and the display panel 12 and output a signal S17 indicating the detection results. The position detection sensor 17 has, for example, a detection element such as a potentiometer or light sensor, etc. and outputs a signal S17 indicating detection results to the power supply circuit 15 and the image signal processing section 18.

The image signal processing section 18 outputs an image signal to the display panel 11 and the display panel 12 based on the program PRG and setting information DT stored, for example, in the memory 16.

For example, the image signal processing section 18 carries out display processing and correction processing, etc. for image signals outputted to the display panel 11 and the display panel 12 based on setting information DT indicating transmittance of a transmission section.

In the present embodiment, the image signal processing section 18 carries out display processing on inputted image signals based on setting information DT indicating the transmittance of transmission sections in such a manner that brightness of light emitted from the partial area 112a of the display surface of the display panel 11 via the transmission section 124, brightness of light emitted from the display section 112 without passing via the transmission section 124, and brightness of light from the display surface of the display section 122 become substantially constant.

According to the above configuration, correction processing of image signals to be outputted to the display section 112 and the display section 122 is carried out based on transmittance of the transmission section 124, and the display section 112 and the display section 122 display according to an image signal that has been subjected to correction processing by the image signal processing section 18. It is therefore possible to compensate for drops in brightness due to the transmittance by the transmission section 124. The brightness of the display screen having the display section 112, transmission section 124 and the display section 122 also becomes substantially constant.

Third Embodiment

A display apparatus 1b according to a third embodiment of the present invention carries out display processing for display sections of the display panel 11 and the display panel 12 based on detection results of detection means. Other aspects of the configuration are substantially the same as for the embodiments described above and are therefore omitted, with only points of distinction being described.

For example, the image signal processing section 18 carries out display processing for the display sections 112 and 122 of the display panel 11 and the display panel 12 based on detection results of a position detection sensor 17. Specifically, the image signal processing section 18 displays images adapted for the size and aspect ratio of the display area at the display section 112 and the display section 122 based on detection results of the position detection sensor 17.

Figure 5:
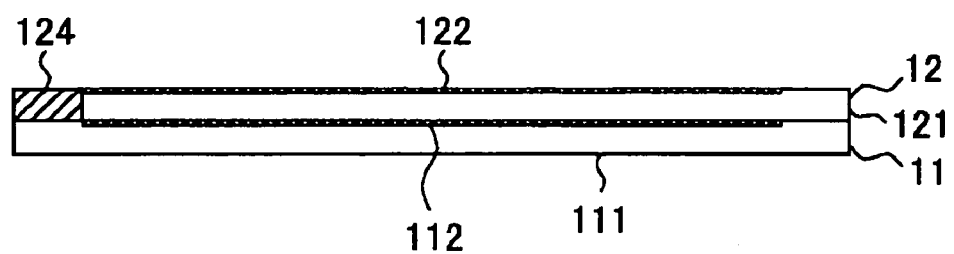
FIG. 5 is a cross-sectional view of a display apparatus in a compact mode according to the third embodiment of the present invention.
Figure 6A:
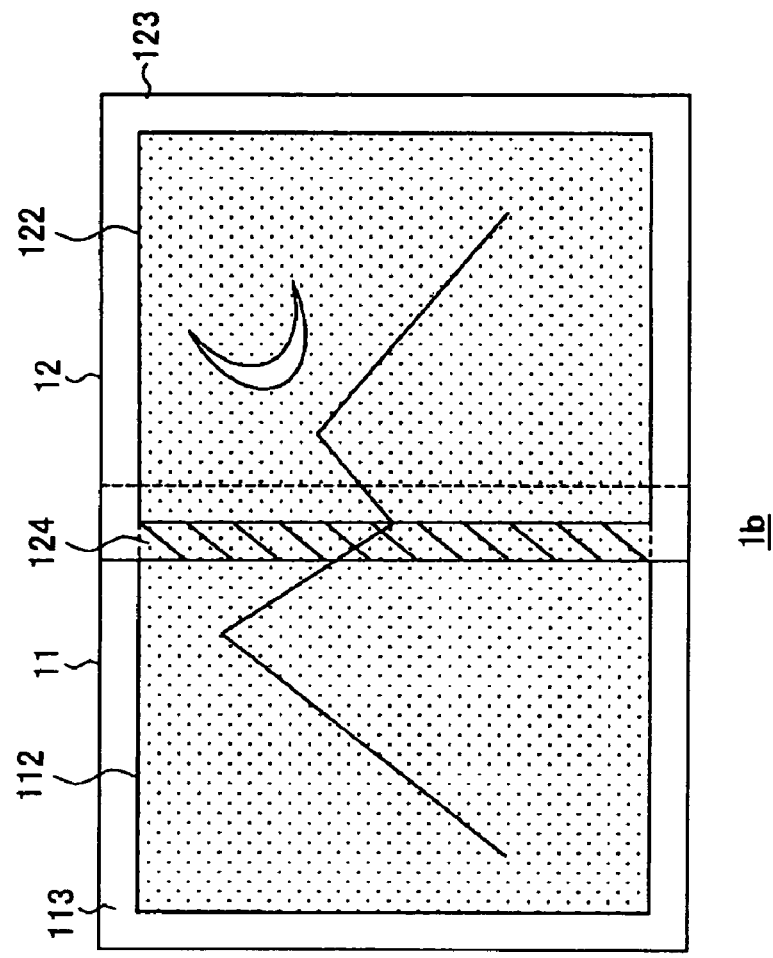
FIG. 6A is a front view of the display apparatus, shown in FIG. 5, in a compact mode.

FIG. 5 is a cross-sectional view of the display apparatus of the third embodiment of the present invention in a compact mode. FIG. 6A is a front view of the display apparatus shown in FIG. 5 in a compact mode, and FIG. 6B is a front view of the unfolded display apparatus as shown in FIG. 3.

Figure 6B:
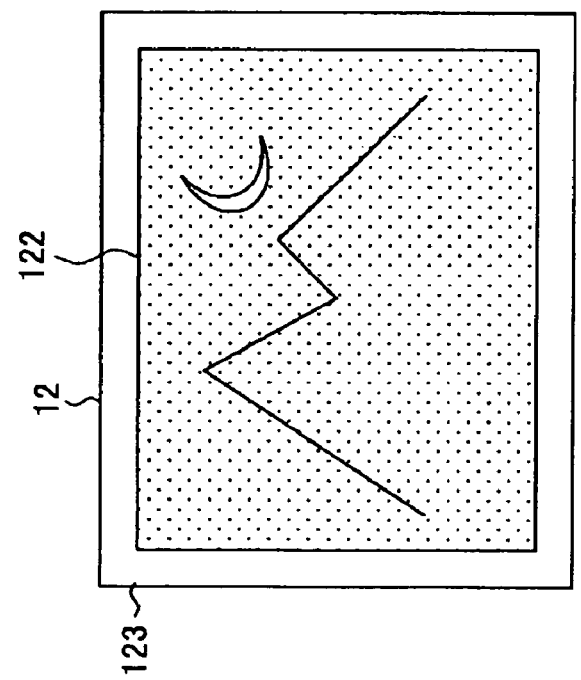
FIG. 6B is a front view of the unfolded display apparatus shown in FIG. 3.

The display panel 11 and the display panel 12 of the display apparatus 1b of the present embodiment are set to the mode shown, for example, in FIG. 2, FIG. 3 and FIG. 6B when unfolded, and they are made to overlap so as to be set to a compact mode as shown in FIG. 5 and FIG. 6A when compacting.

As shown, for example, in FIG. 5 and FIG. 6, the image signal processing section 18 carries out display processing so as to bring about an image size an and aspect ratio appropriate for the size and aspect ratio of the display area of the display section 112 and the display section 122 based on detection results of the position detection sensor 17. Further, the image signal processing section 18 carries out display processing on, for example, the same image signal in such a manner that an image ready to display at the display panel 12 is turned by 90 degrees so as to be displayed as shown in FIG. 6A and perform adjustments so that the aspect ratio matches with the respective modes.

Figure 7A:
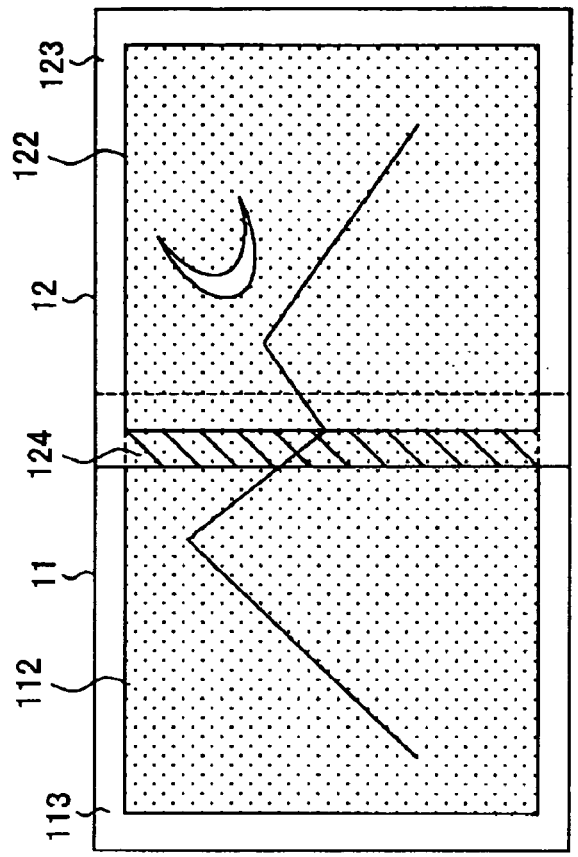
FIG. 7A is a view showing the display apparatus, shown in FIG. 6A and FIG. 6B, in the process of unfolding.
Figure 7B:
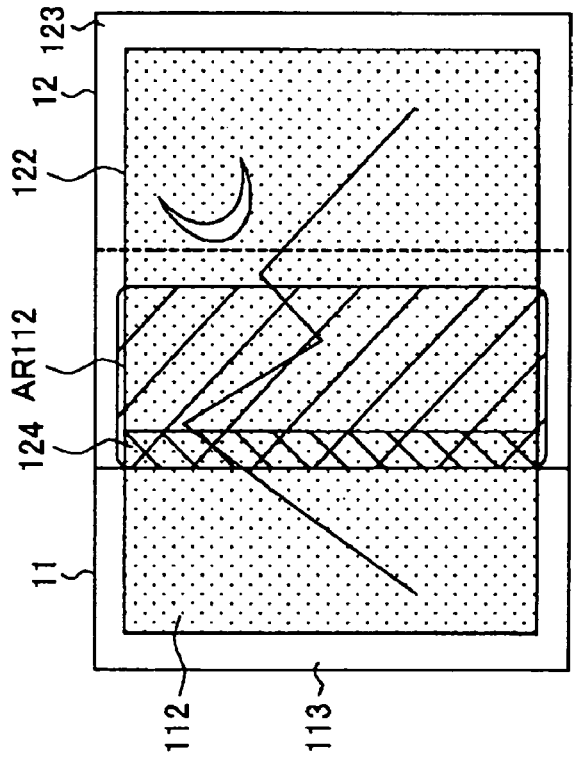
FIG. 7B is a front view of the unfolded display apparatus shown in FIG. 6B.

FIG. 7A is a view showing the display apparatus, shown in FIG. 6A and FIG. 6B, in the process of unfolding. FIG. 7B is a front view of the unfolded display apparatus shown in FIG. 6B. For example, FIG. 7A is a display of aspect ratio 4:3, and FIG. 7B is, for example, a wide display of aspect ratio 16:9. The image signal processing section 18 carries out display processing of the inputted image signal based on detection results of the position detection sensor 17 described above in such a manner as to give a display screen corresponding to the aspect ratio of the display panel 11 and display panel 12.

During this time, for example, the image signal processing section 18 suppresses display of images for a region AR 112, facing the display section 122, of the display surface of the display section 112 of the display panel 11. Namely, an image display of a portion of the display screen of the display section 112 overlapping with the display section 122 is inhibited (not displayed).

Figure 8:
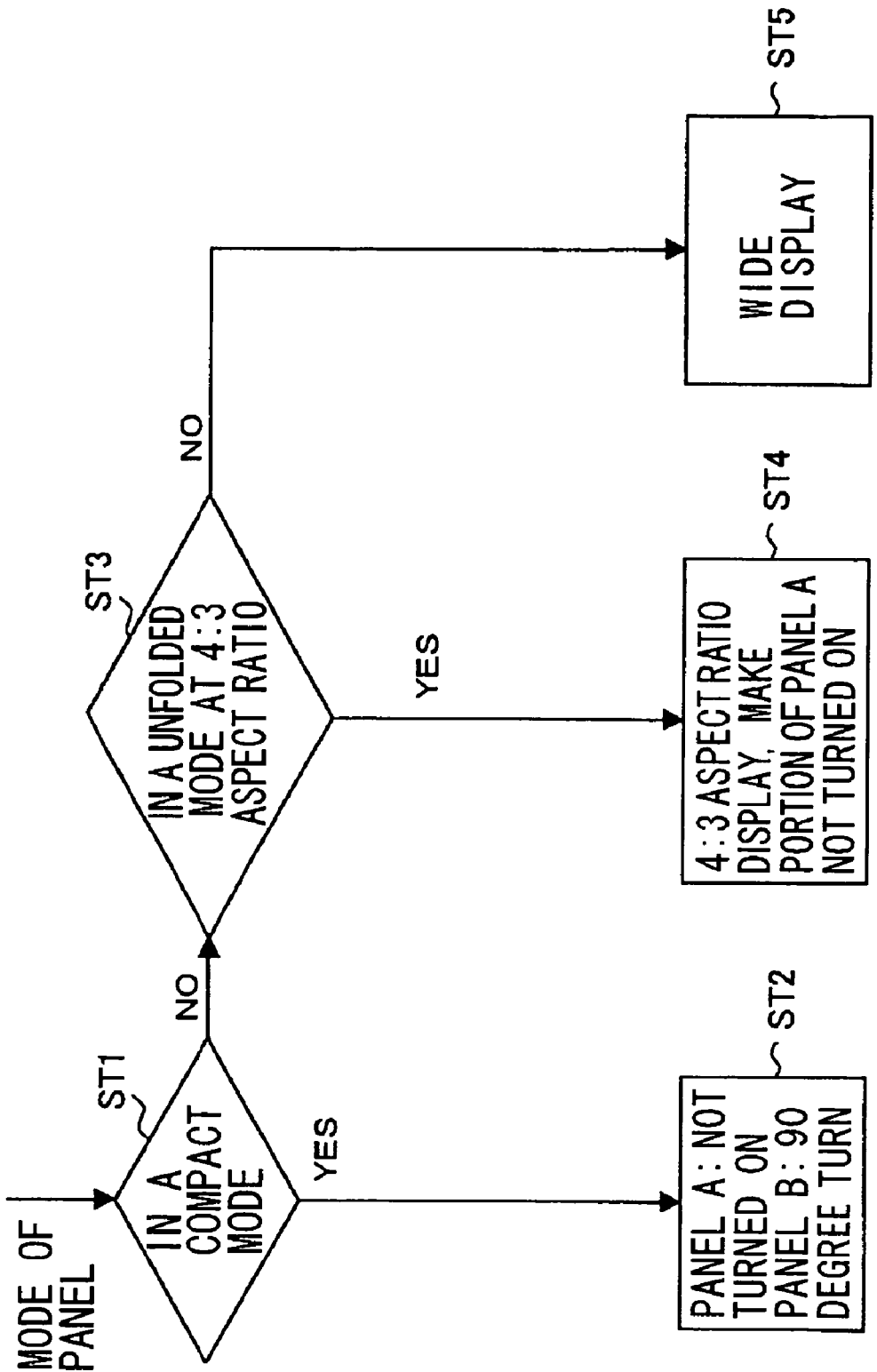
FIG. 8 is a flow chart for illustrating a specific example of operation of a display apparatus according to the third embodiment of the present invention.

FIG. 8 is a flowchart illustrating a specific example of operation of the display apparatus according to another embodiment of the present invention. Operation of the display apparatus, mainly the operation of the image signal processing section 18, is described with reference to FIG. 8.

In step ST1, the image signal processing section 18 determines whether or not the display apparatus has been made compact based on a detection signal S17 indicating a measure of overlapping of the moveable display panels 11 and 12 outputted from the position detection sensor 17.

If it is determined in step ST1 that the display apparatus have been made compact, i.e. the display panel 11 and the display panel 12 overlap to give the minimum display screen, the image signal processing section 18 ensures that the display section 112 of the display panel 11 is not illuminated (ST2). Specifically, for example, the image signal processing section 18 inhibits the image signal to be outputted to the display section 112 of the display panel 11. Further, the power supply circuit 15 inhibits a voltage supplied to the display section 112 of the display panel 11 based on a detection signal S17 from the position detection sensor 17 and ensures that the display section 112 is not illuminated.

Further, the image signal processing section 18 implements rotation display processing of the image signal through ninety degrees and displays the image turned through ninety degrees at the display section 122 of the display panel 12.

On the other hand, if it is determined in step ST1 that the display apparatus has not been made compact, display processing is carried out according to the overlapping mode of the display panel 11 and the display panel 12. Specifically, in step ST3, for example, the image signal processing section 18 determines whether or not the display screen including the display section 112, the transmission section 124 and the display section 122 is of a predetermined aspect ratio of, for example, 4:3, based on the detection signal from the position detection sensor 17. If the aspect ratio is determined to be 4:3, display processing appropriate for this aspect ratio is implemented, and displaying such as shown, for example, in FIG. 7A is carried out at the display section 112 and the display section 122 (ST4). During this time, as described above, the image signal processing section 18 inhibits the display of images for a region AR 112, facing the display section 122, of the display surface of the display section 112 of the display panel 11.

On the other hand, in step ST3, if the aspect ratio of the display screen including the display section 112, the transmission section 124 and the display section 122 is not 4:3 but rather is such that the overlapping regions are smaller such as, for example, a wide mode as shown in FIG. 7B, the image signal processing section 18 carries out wide displaying (ST5).

In the embodiment described above, the image signal processing section 18 carries out display processing for the display section 112 and the display section 122 and, more specifically, carries out display processing according a size and aspect ratio of a display screen including the display section 112, the transmission section 124 and the display section 122 based on a signal indicating detection results from the position detection sensor 17 for detecting overlapping of the display section 112 and the display section 122. It is therefore possible to carry out displaying according to overlapping of the display panels.

Fourth Embodiment

Figure 9:
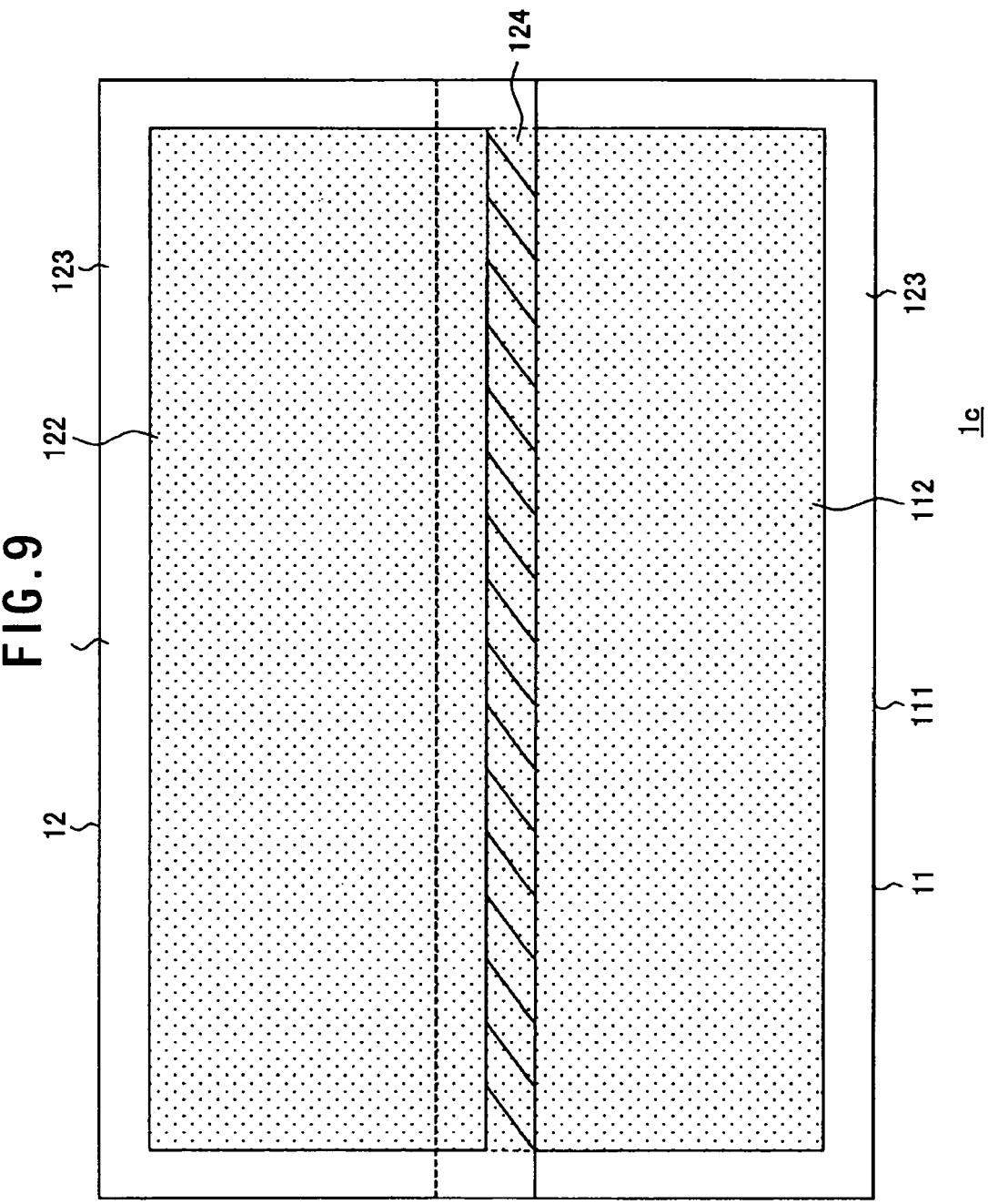
FIG. 9 is a front view showing a display apparatus according to the fourth embodiment of the present invention.

FIG. 9 is a front view showing a display apparatus according to a fourth embodiment of the present invention. For example, in the first embodiment shown in FIG. 2, the display panels 11 and 12 are arranged in the vertical direction of the drawings but with a display apparatus 1c according to the present embodiment, a single large display screen is constructed by arranging the display panels 11 and 12 in a horizontal direction of the drawings. Further, as with the first embodiment, the display panel 11 and the display panel 12 are moveable so as to enable the size of the overlapping regions to be varied. Other aspects are the same, and their description is therefore omitted. Because of this, at the time of folding (compacting), the display apparatus becomes longer in the longitudinal direction compared with the first embodiment and the aspect ratio therefore becomes larger.

Fifth Embodiment

Figure 10:
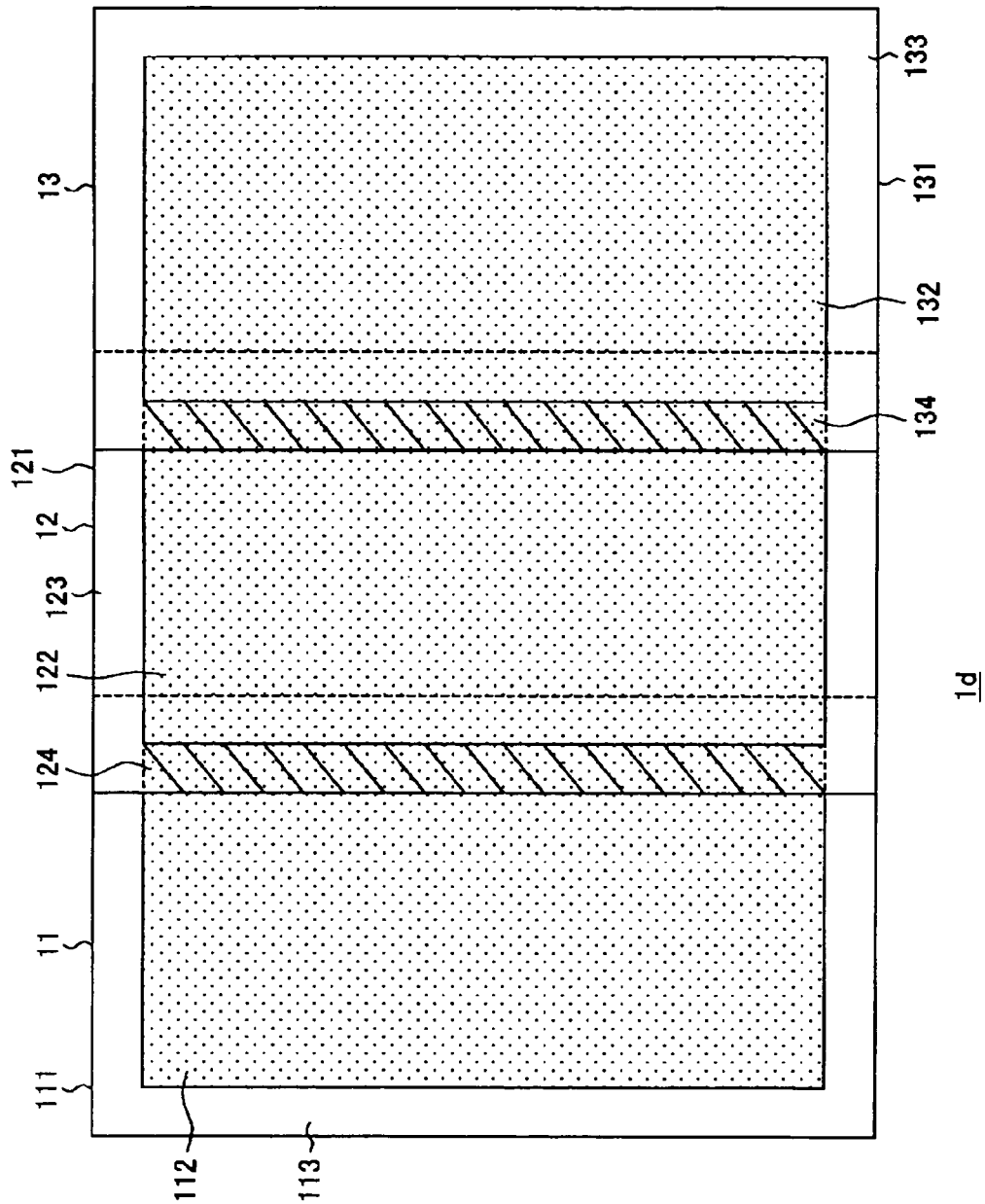
FIG. 10 is a front view showing a display apparatus according to the fifth embodiment of the present invention.

FIG. 10 is a front view showing a display apparatus of a fifth embodiment of the present invention. A display apparatus 1d of this embodiment has a single large display screen made by arranging a plurality of display panels, for example, three display panels 11 to 13, in a horizontal direction of the drawings.

Specifically, a point of distinction of the fifth embodiment with the first embodiment is that the fifth embodiment is further provided with a display panel 13. The display panel 13 has a substrate 131, a display section 132, a non-displaying section 133 and a transmission section 134. Each structural element is substantially the same as for the display panel 12 and a description is therefore omitted. Further, as with the first embodiment, the display panels 11 to 13 are moveable so as to enable the size of the overlapping regions to be varied.

The display apparatus described above also may include a plurality of display panels. The display screen then becomes smaller at the time of compacting and larger at the time of unfolding.

Sixth Embodiment

Figure 11:
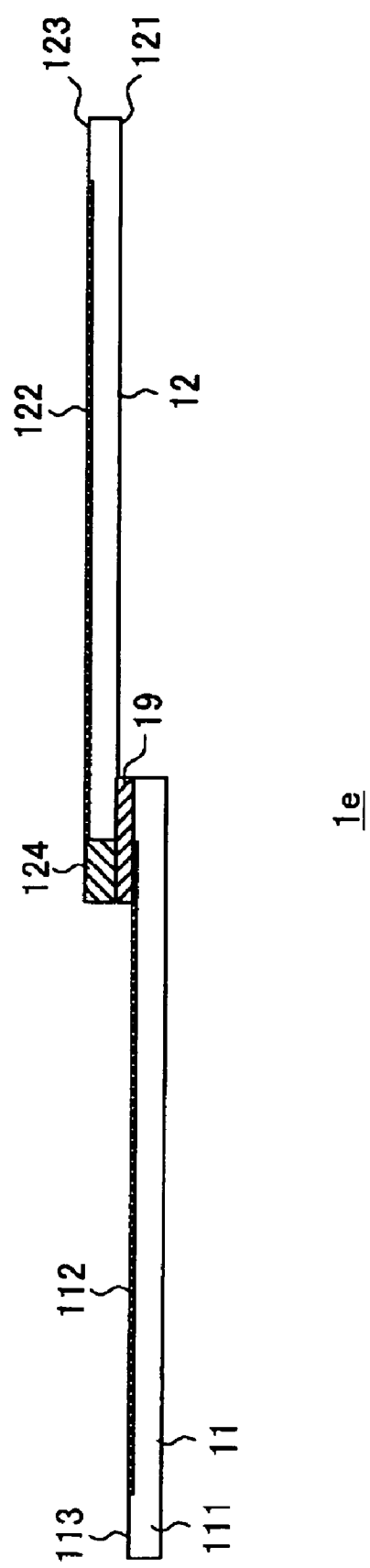
FIG. 11 is a cross-sectional view of a display apparatus according to the sixth embodiment of the present invention.

FIG. 11 is a front view of a display apparatus of a sixth embodiment of the present invention. A display apparatus 1e of this embodiment has an antireflection section 19. Other aspects of the configuration are substantially the same as for the first embodiment described above and description thereof is therefore omitted. The antireflection section 19 is an example of antireflection means according to the present invention.

For example, when a gap, etc. exists between the display section 112 and the transmission section 124, there may be cases where irregular diffusion of external light and light from the display section 112 occurs at a boundary portion due to changes in the refractive index due to air, etc. of the gap, so picture quality of images of the display section 112 provided via the transmission section 124 falls.

As a result, the display apparatus 1e of this embodiment is provided with an antireflection section 19 at least between the display section 112 and the transmission section 124. As shown, for example, in FIG. 11, the antireflection section 19 is formed between the display section 112 and the transmission section 124 and preferably at an overlapping region of the display panel 11 and the display panel 12 in order to alleviate ambient light at overlapping portions in the vicinity of the boundary. As shown, for example, in FIG. 11, the antireflection section 19 includes an antireflection member for transmitting light, such as transparent silicon rubber or antireflection film, etc. that transmits light.

Further, the antireflection section 19 may subject one of the display panel 11 or the display panel 12 to antireflection processing at, for example, a region between the display section 112 and the transmission section 124, or preferably at the overlapping region of the display panel 11 and the display panel 12.

By providing the antireflection section 19 between the display section 112 and the transmission section 124 as described above, it is possible to alleviate irregular reflection, etc. of external light and light from the display section 112, and there is no reduction in image quality of the image of the display section 112 via the transmission section 124. Further, the image signal processing section 18 carries out display processing to compensate for a reduction in light from the display section 112 due to the antireflection section 19 so as to make it possible to display a higher-quality image.

Seventh Embodiment

Figure 12:
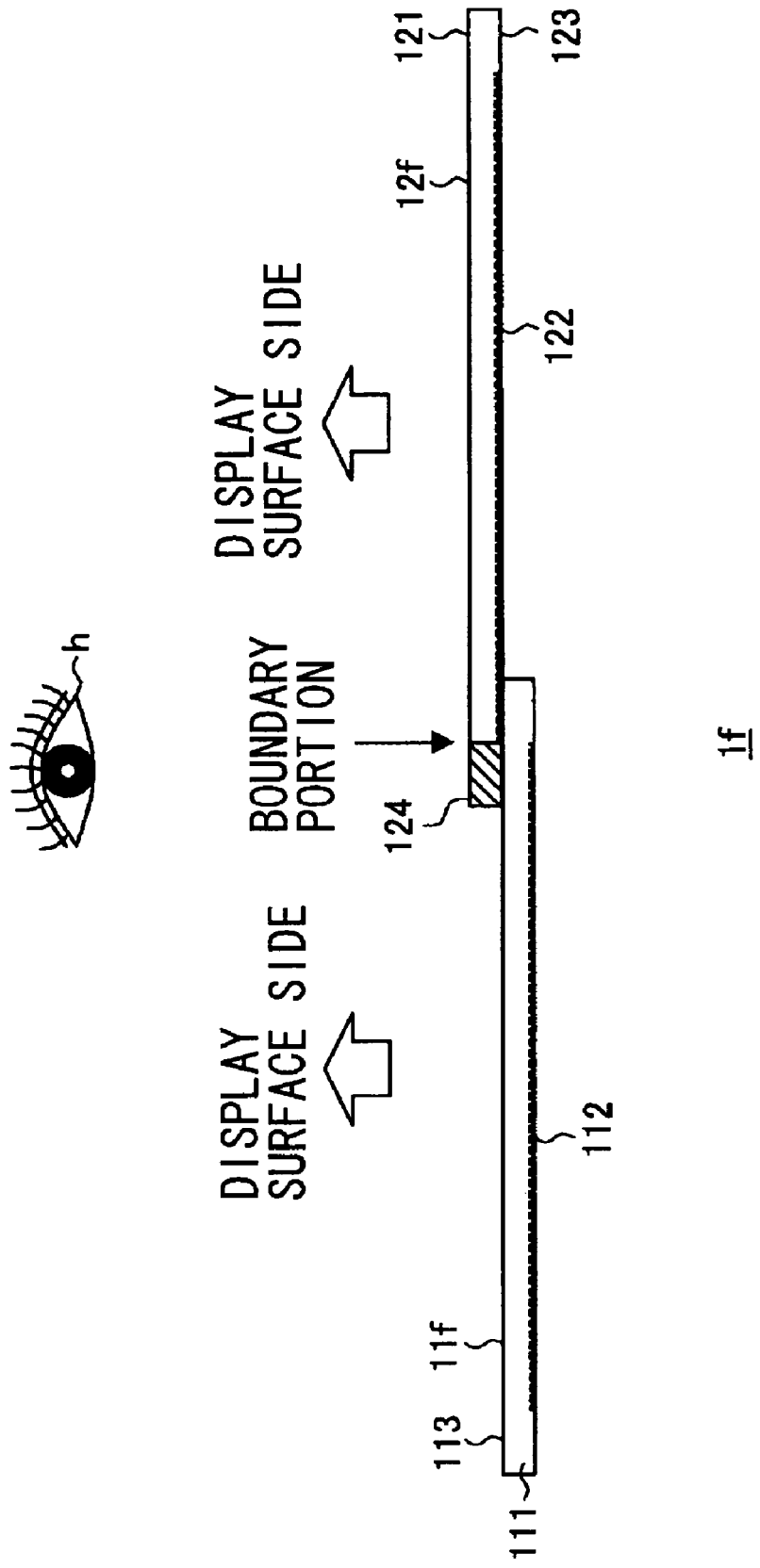
FIG. 12 is a cross-sectional view of a display apparatus according to the seventh embodiment of the present invention.

FIG. 12 is a front view of a display apparatus of a seventh embodiment of the present invention. A display apparatus 1f of this embodiment includes a display panel 11f and a display panel 12f. The display panel 11f is such that display section 112 is formed at the surface opposite the display surface side of the substrate 111. The display panel 12f is such that display section 122 is formed at the surface opposite the display surface side of the substrate 121.

Further, during this time, the substrates 111 and 121 are formed of members that transmit light, such as, for example, glass, plastic or film, etc.

The image signal processing section 18 of this embodiment carries out correction processing of an image signal outputted at the display sections 112 and 122 based on transmittance of the substrates 111 and 121 of which the display sections 112 and 122 are formed. Specifically, the image signal processing section 18 of this embodiment carries out correction processing of an image signal to be outputted at the display sections 112 and 122 based on setting information indicating transmittance of the substrates 111 and 121 of which the display sections 112 and 122 are formed stored in the memory 16.

Specifically, the image signal processing section 18 carries out display processing so that the brightness of light from the display section 112 via the substrate 111 and the transmission section 124, the brightness of light from the display section 112 via the substrate 111, and the brightness of light from the display section 122 via the substrate 121 are substantially constant.

In the event of viewing from the front h of the display surface side, the brightness of the display screen having the display panel 11, the display panel 12 and the transmission section 124 becomes substantially constant, and displaying with high image quality is possible.

Eighth Embodiment

Figure 13:
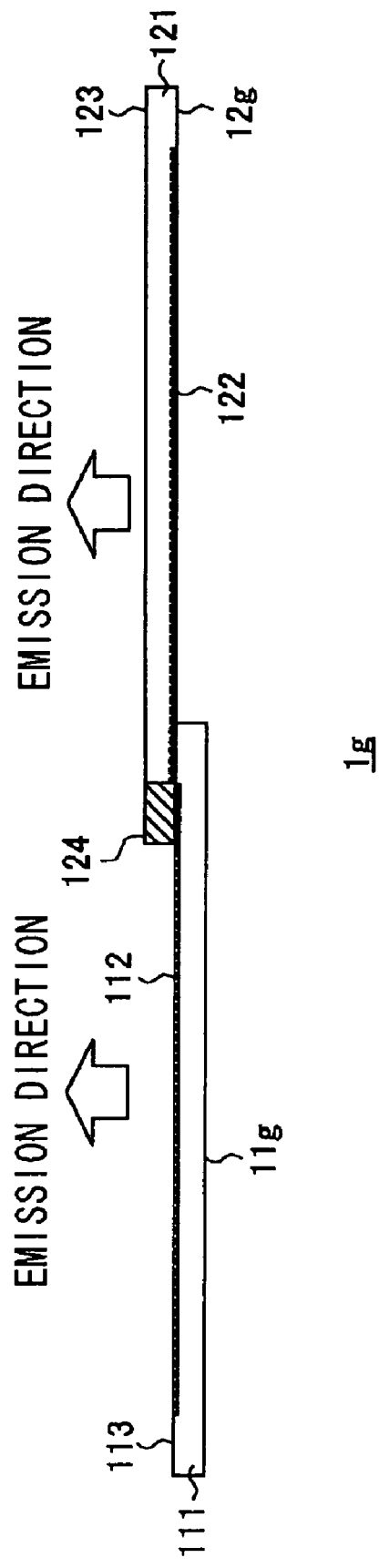
FIG. 13 is a cross-sectional view of a display apparatus according to the eighth embodiment of the present invention.

FIG. 13 is a cross-sectional view of a display apparatus of an eighth embodiment of the present invention. A display apparatus 1g of this embodiment includes a display panel 11g and a display panel 12g.

The display panel 11g is such that the display section 112 is formed at a surface opposite the display section 122 on the substrate 111. The display panel 12g is such that the display section 122 is formed at a surface opposite the display section 112 on the substrate 121.

Namely, a difference in level between the display screens of the two panels is reduced, and the influence due to the thickness of the substrate 111 and the substrate 121 can be reduced.

Further, the image signal processing section 18 of this embodiment carries out display processing so that the brightness of light from the display section 112, the brightness of light from the display section 112 via the transmission section 124, and the brightness of light from the display section 122 via the substrate 121 are substantially constant.

Specifically, because the direction of light is different for the substrates 111 and 112 at the display panels 11g and 12g, there may be cases where the brightness of the display panels 11g and 12g is different for the same image signals due, for example, to the transmittance of anode or cathode electrodes of the display sections 112 and 122, the transmittance of the substrate, or the apparatus structure, etc. In this event, as described above, signal levels of the display sections 112 and 122 are operated so that the image signal processing section 18 compensates for differences in luminous efficiency of the display panels 11g and 12g.

In the case of display sections 112, 122 including a light-emitting element, the image signal processing component 18 carries out processing, with respect to the same picture signal level, to make the light-emitting element emit light for a brightness according to a transmittance of boards 111, 121, and the transmission section 124 by controlling the voltage/current conversion efficiency inside the display panels 112, 122, for example, the voltage/current conversion efficiency of a driving transistor of a light emitting element in a pixel circuit.

As a result, the brightness at the display screen constructed from the respective configuration elements becomes substantially constant, and the display apparatus 1g is capable of displaying images of a higher image quality.

Next, a description is given of a specific example of a display apparatus having a moveable section 30 capable of changing the size of the overlapping regions of the display panels 11 and 12.

Ninth Embodiment

Figure 14A:
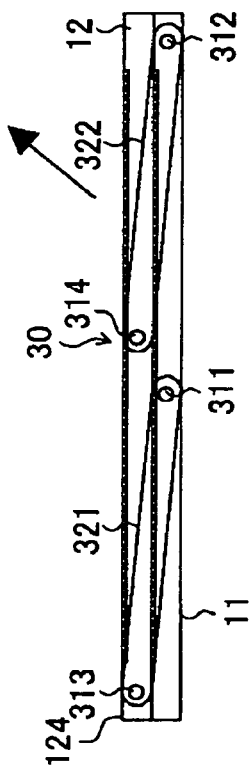
FIG. 14A is a side view of a specific example of the display apparatus in a miniaturized mode.
Figure 14B:
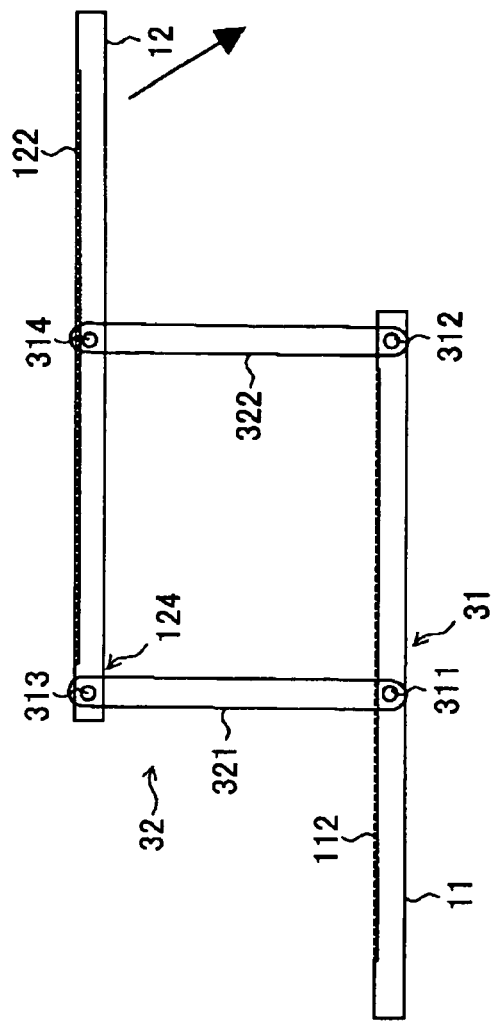
FIG. 14B is a side view showing the display apparatus shown in FIG. 14A, in the process of unfolding.
Figure 14C:
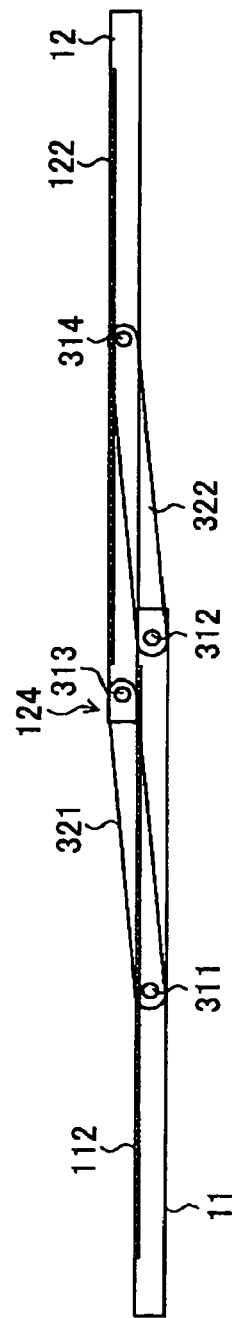
FIG. 14C is a side view of the unfolded display apparatus shown in FIG. 14A.

FIG. 14 is a side view of a display apparatus of a ninth embodiment of the present invention. FIG. 14A is a side view showing a specific example of a display apparatus in a compacted mode. FIG. 14B is a side view showing the display apparatus shown in FIG. 14A in the process of unfolding. FIG. 14C is a side view of the unfolded display apparatus shown in FIG. 14A.

The moveable section 30 has, for example, a support section 31 and a holding section 32 for holding the support section 31. Specifically, as shown, for example, in FIG. 14A to FIG. 14C, the support section has one or a plurality of support sections 311 to 314 on the display panels 11 and 12, respectively.

Further, as shown, for example, in FIG. 14A to FIG. 14C, the holding section 32 has a holding section 321 for holding a support section 311 provided at the display panel 11 and a support section 313 provided at the display panel 12 and a support section 322 for holding a support section 312 provided at the display panel 11 and a support section 314 provided at the display panel 12.

With the above configuration, as shown in FIG. 14A to FIG. 14C, the display panels 11 and 12 move in parallel so as to be in a compact mode and a unfolded mode as a result of the holding sections 321 and 322 rotating centered, for example, about the support sections 311 to 314.

By providing the moveable section 30 as described above, it is possible to change the size of the overlapping regions of the display panels 11 and 12 with a straightforward configuration.

Tenth Embodiment

Figure 15A:
FIG. 15A to FIG. 15E are side views of a display apparatus according to the tenth embodiment of the present invention.
Figure 15B:
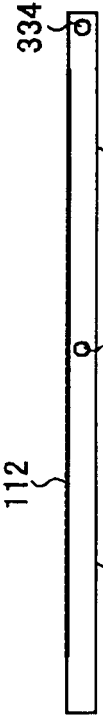
Figure 15C:
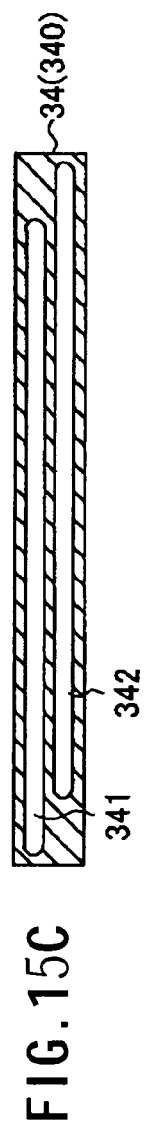
Figure 15D:
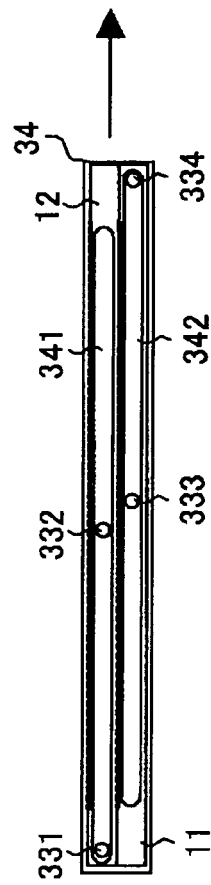
Figure 15E:
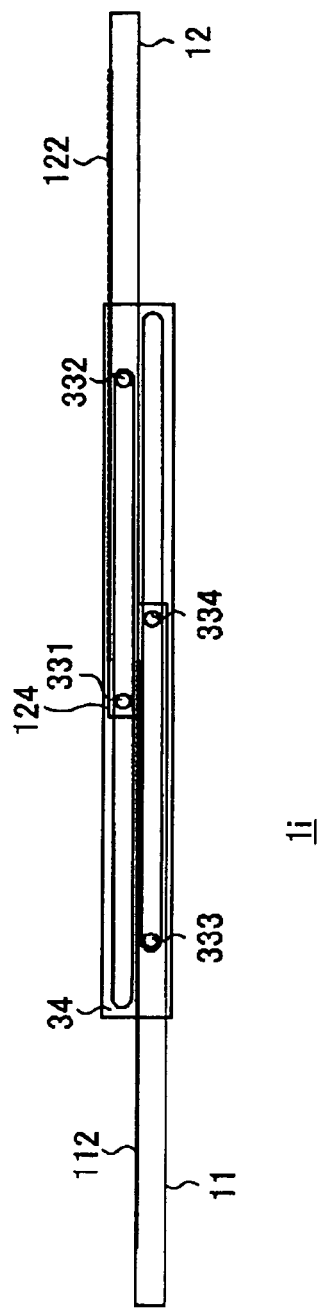

FIG. 15A to FIG. 15E are side views of a display apparatus of a tenth embodiment of the present invention. FIG. 15A is a side view of the display panel 11, FIG. 15B is a side view of the display panel 12, and FIG. 15C is a side view of a junction section. FIG. 15D is a side view showing a specific example of a display apparatus in a compacted mode. FIG. 15E is a side view of the unfolded display apparatus shown in FIG. 15D.

The display apparatus 1i of this embodiment is equipped with a moving holding section 34, as the moveable section 30, for holding the display panels 11 and 12 in a manner enabling relative movement. As shown, for example, in FIG. 15A and FIG. 15B, the moving holding section 34 is equipped with a protrusion section 33 at side surface portions of the display panels 11 and 12. Specifically, as shown in FIG. 15A, a protrusion section 331 is provided at an end of a side surface portion of the display panel 12 and a protrusion section 332 is provided at a central portion of a side surface of the display panel 12, and as shown in FIG. 15B, a protrusion section 333 is provided at a central portion of a side surface portion of the display panel 11 and a protrusion section 334 is provided at an end of a side surface portion of the display panel 11.

Further, as shown, for example, in FIG. 15C, the moving holding section 34 is provided with a junction section 340 formed with grooves engaged by protrusion sections 33 of the display panels 11 and 12.

A groove 341 and a groove 342 are formed at the junction section 340 as shown, for example, in FIG. 15C.

As shown, for example, in FIG. 15D, the display apparatus 1i of the above configuration is such that, in the compact mode, a protrusion section 331 and a protrusion section 332 engage with the groove 341, and a protrusion section 333 and a protrusion section 334 engage with the groove 342. As shown in FIG. 15D and FIG. 15E, the protrusion sections 331 to 334 slide along the grooves 341, 342 in an engaging state, and then the two display panels 11 and 12 move relatively, which makes it possible to change between a compact mode and an unfolded mode.

As described above, it is possible for the size of the overlapping regions of the display panels 11 and 12 to be changed with a straightforward configuration by providing the moving holding section 34 holding the display panels 11 and 12 in a manner capable of relative movement.

Eleventh Embodiment

FIG. 16A to FIG. 16C are side views of a display apparatus of an eleventh embodiment of the present invention. FIG. 16A is a side view of a display apparatus when compacted. FIG. 16B is a side view of the display apparatus shown in FIG. 16A, in the process of unfolding, and FIG. 16C is a side view of the unfolded display apparatus shown in FIG. 16A.

The display apparatus 1j of this embodiment is, for example, provided with display panels 11 and 12 and includes a turnable support section 40 for supporting the display panels 11 and 12 in a freely rotating manner, and it is possible to fold the display panels 11 and 12 taking the turnable support section 40 as an axis.

Specifically, as shown, for example, in FIG. 16A, the turnable support section 40 includes a support section 41 provided at an end portion of the display panel 11 and a connection section 42, provided in the vicinity of an end portion of the display panel 12, engaging in a freely turnable manner with support section 41.

The display apparatus 1j of the configuration described above is able to be unfolded from a mode where the support section 41 and the connection section 42 engage so that the display panels 11 and 12 are folded as shown, for example, in FIG. 16A, to a mode where the display panels 11 and 12 are unfolded, as shown in FIG. 16B and FIG. 16C. Conversely, compacting is also possible.

As described above, in this embodiment, a turnable support section 40 for supporting the display panels 11 and 12 in a freely rotating manner is provided. It is therefore possible to change the size of overlapping regions of the display panels 11 and 12 with a straight forward configuration.

The present invention is not limited to these embodiments, and various arbitrary and appropriate modifications are possible. For example, implementation through combinations of the above embodiments is possible. Further, the operation flow for the image signal processing section 18 is not limited to the above embodiments.

For example, application to a display apparatus including a combination of a plurality of display means such as, for example, a display panel, etc. is also possible.

What is claimed is:

1. A display apparatus comprising:
    first display means including a first display section; and
        second display means including a second display section and a non-display section located at an outer periphery of the second display section; wherein partial area of a display surface of the first display section of the first display means faces the non-display section of the second display means; and wherein portion of the non-displaying section of the second display means, which is facing the display surface of the first display section is provided with a transmission section configured to transmit light from the first display section; and further comprising: control means for carrying out correction processing of an image signal to be outputted to the first display section or the second display section based on a transmittance of the transmission section; wherein the first display section or the second display section carries out a display operation depending on an image signal that is subjected to the correction processing by the control means.

2. The display apparatus according to claim 1, wherein: the control means carries out the correction processing of an image signal to be outputted to the first display section or the second display section depending on a transmittance of a substrate on which the first display section or the second display section is formed.

3. The display apparatus according to claim 1, wherein: the control means carries out a display processing such that brightness of light from the first display section via the transmission section, brightness of light from the first display section, and brightness of light from the second display section are substantially constant.

4. The display apparatus according to claim 1, further comprising: detection means for detecting overlapping of the first display means and the second display means; wherein the control means carries out a display processing of the first display section or the second display section based on a detection result by the detection means.

5. The display apparatus according to claim 1, wherein: the control means controls an image display at an area of a display surface of the first display section of the first display means, which is facing the second display section.

6. The display apparatus according to claim 1, wherein: a circuitry relating to displaying of the second display section is formed at a portion of the non-display section except the transmission section.

7. The display apparatus according to claim 1, further comprising:
antireflection means, at least being disposed between the first display section and the transmission section.

8. The display apparatus according to claim 1, further comprising:
the second display means on which the second display section is formed on a surface of a substrate, the surface facing the first display means.

9. The display apparatus according to claim 1, further comprising:
the first display means on which the first display section is formed on a surface of a substrate, the surface facing the second display means.

10. The display apparatus according to claim 1, further comprising:
movable means for changing a size of an overlapping area of the first display means and the second display means.

11. The display apparatus according to claim 10, wherein: the movable means includes a moving holding section for holding the first display means and the second display means in such a way that both means are allowed to have relative motion.

12. The display apparatus according to claim 10, wherein: the movable means includes a turnable support section for supporting the first display means and the second display means in such a way that both means are allowed to be freely turned; and
the movable means allows the first display means and the second display means to be folded about the turnable support section as an axis.

13. The display apparatus according to claim 10, wherein: the movable means includes;
one or a plurality of support sections provided at the first display means and the second display means; and
a holding section for holding the support section provided at the first display means and the support section provided at the second display means.

14. The display apparatus according to claim 1, wherein the transmission section includes glass, plastic, or film that transmits light.

15. The display apparatus according to claim 1, wherein the first display means or the second display means is an active matrix display apparatus or a passive matrix display apparatus.

16. The display apparatus according to claim 1, wherein the first display means or the second display means is a liquid crystal display apparatus or an organic electroluminescent display apparatus.

17. The display apparatus according to claim 1, wherein the first display means or the second display means is a transmissive liquid crystal display apparatus, a reflective transmissive liquid crystal display apparatus, or a semi-transmissive liquid crystal display apparatus.

18. A display method using a display apparatus comprising;
first display including a first display section;
second display including a second display section and a non-display section located at an outer periphery of the second display section; and
control means for carrying out correction processing of an image signal to be outputted to the first display section or the second display section based on a transmittance of the transmission section;
wherein a partial area of a display surface of the first display section of the first display faces the non-display section of the second display; and
wherein a portion of the non-displaying section of the second display, which is facing the display surface of the first display section, is provided with a transmission section configured to transmit light from the first display section; and
comprising a step of carrying out a display operation by the first display section or the second display section depending on an image signal that is subjected to the correction processing by the control means.

* * * * *